United States Patent [19]

Bangert

[11] Patent Number: 5,022,711

[45] Date of Patent: Jun. 11, 1991

[54] AUXILIARY TRACTOR WHEEL FOR INCREASED TRACTION

[76] Inventor: Norman E. Bangert, 1012 Virginia, Des Moines, Iowa 50315

[21] Appl. No.: 570,128

[22] Filed: Aug. 20, 1990

[51] Int. Cl.⁵ .............................................. B60B 15/10
[52] U.S. Cl. ........................................ 301/47; 301/45; 301/40 R
[58] Field of Search ..................... 301/41 R, 43, 44 R, 301/45, 47; 305/4, 5, 15, 19

[56] References Cited

U.S. PATENT DOCUMENTS

| | | | |
|---|---|---|---|
| 1,236,109 | 8/1917 | Rose | 301/47 X |
| 2,361,864 | 10/1944 | Nelson | 301/44 R |
| 2,437,325 | 3/1948 | Koeppel | 301/45 |
| 2,544,050 | 3/1951 | Schnell | 301/47 |
| 2,679,435 | 5/1954 | Finan | 301/45 |

FOREIGN PATENT DOCUMENTS 8700804  2/1987  World Int. Prop. O. ............ 301/43

Primary Examiner—Russell D. Stormer
Attorney, Agent, or Firm—Zarley, McKee, Thomte, Voorhees & Sease

[57] ABSTRACT

An auxiliary traction wheel is provided for use in combination with a tractor wheel so as to provide increased traction for the tractor. The traction wheel includes a pair of spaced apart rims at the perimeter of the wheel defining a channel therebetween. A plurality of traction plates are pivotally mounted within the channel for movement between a retracted position, wherein the traction plates are drawn into the channel, and an extended position wherein the traction plates extend radially outwardly beyond the perimeter edge of the wheel. The traction plates are interconnected by connecting rods so as to pivot in unison. Tension cables control the movement of the traction plates between the retracted and extended positions.

17 Claims, 5 Drawing Sheets

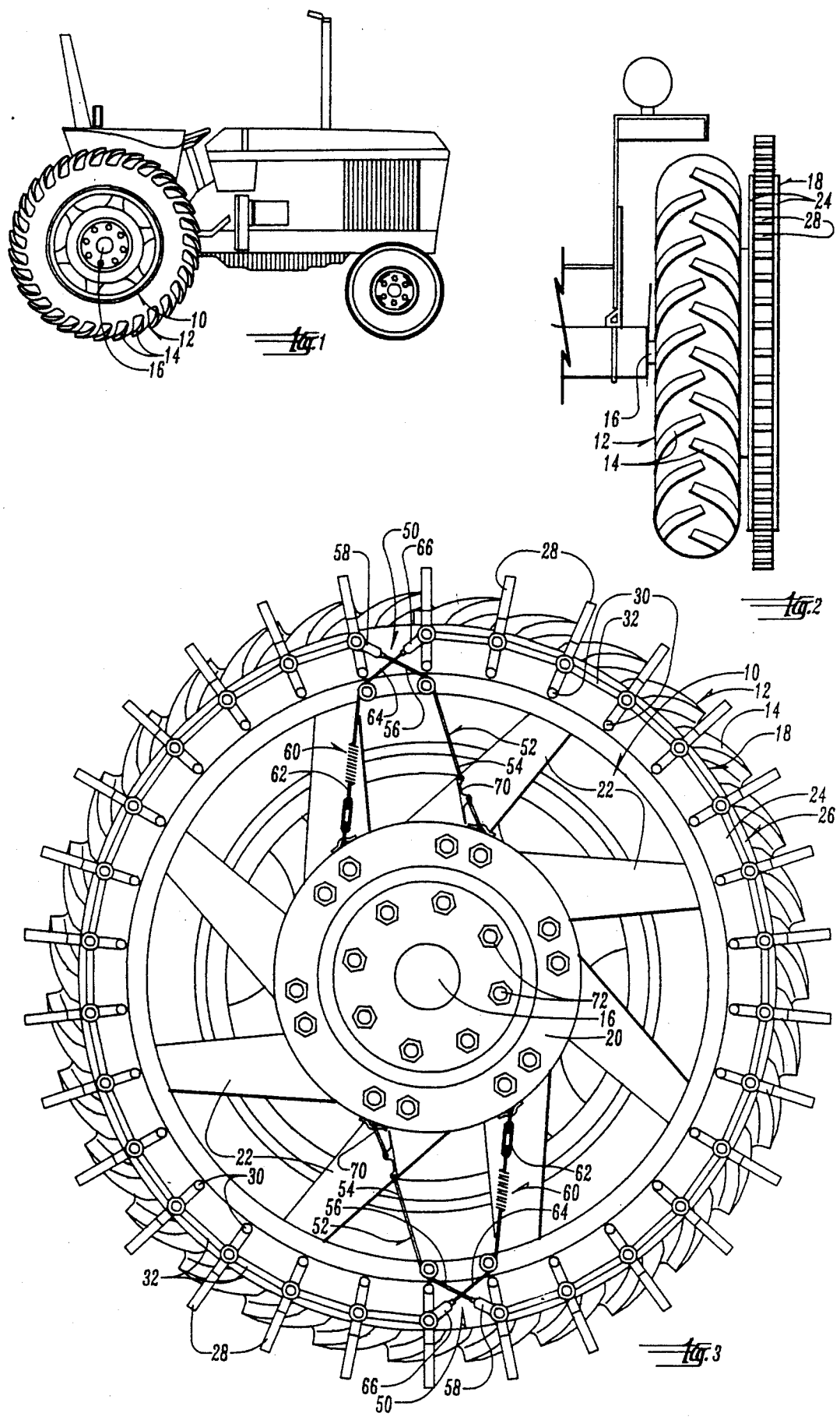

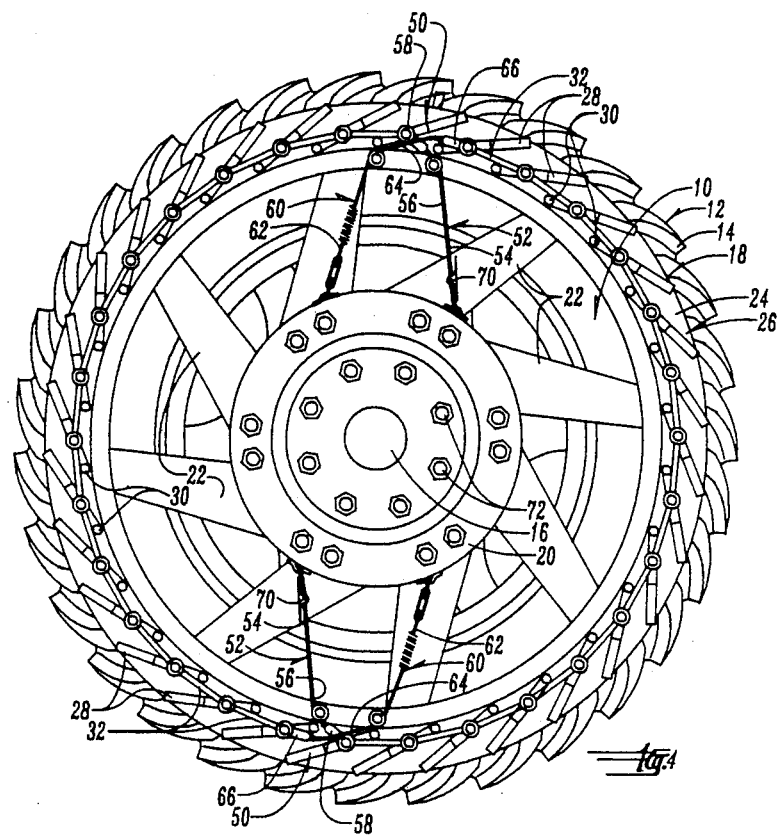
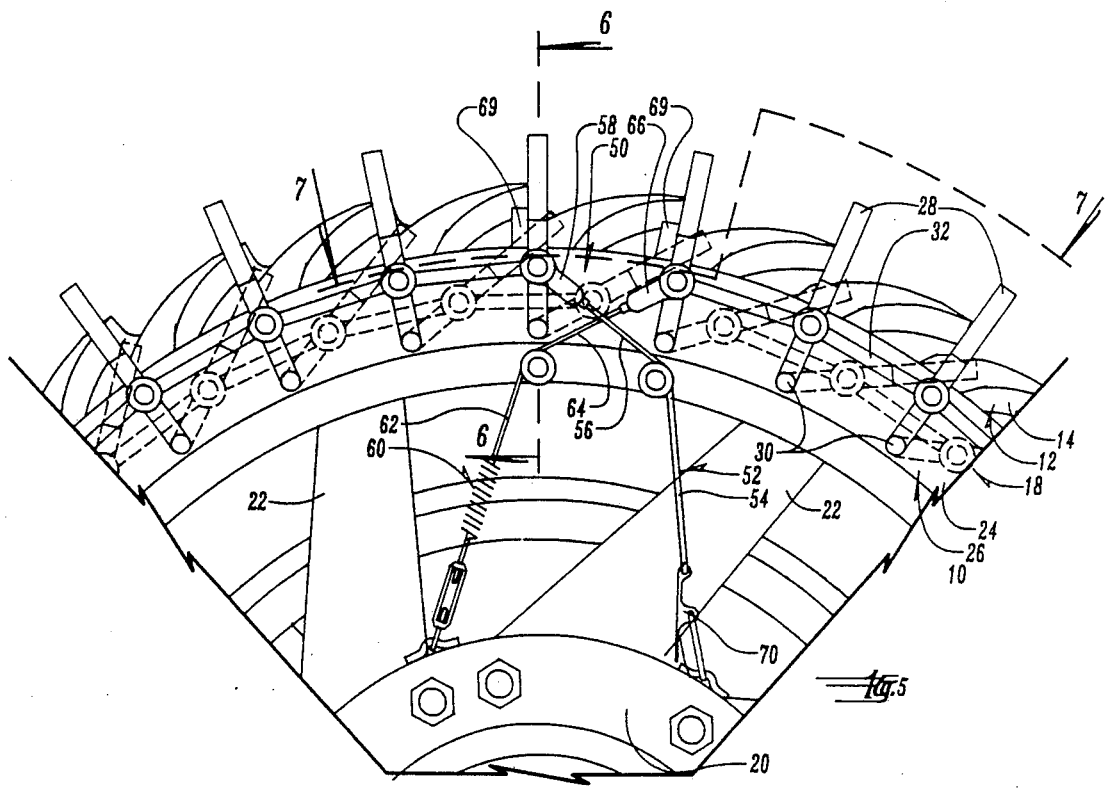

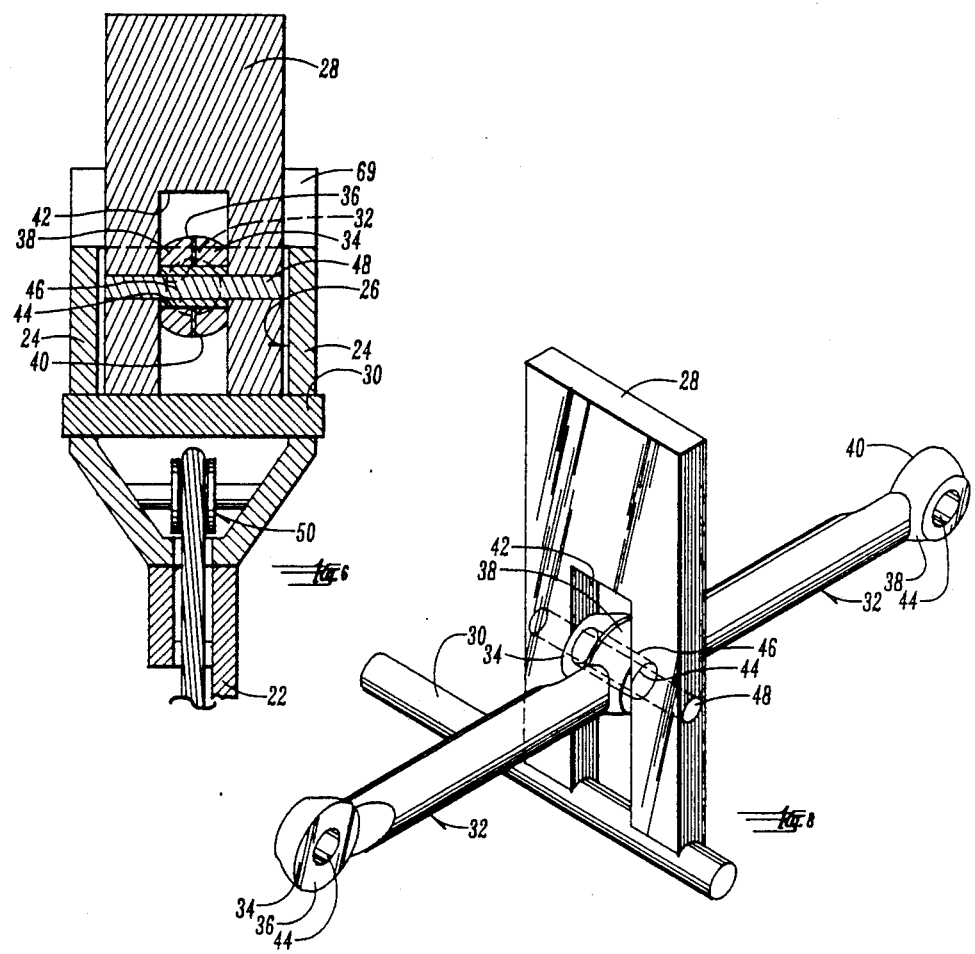
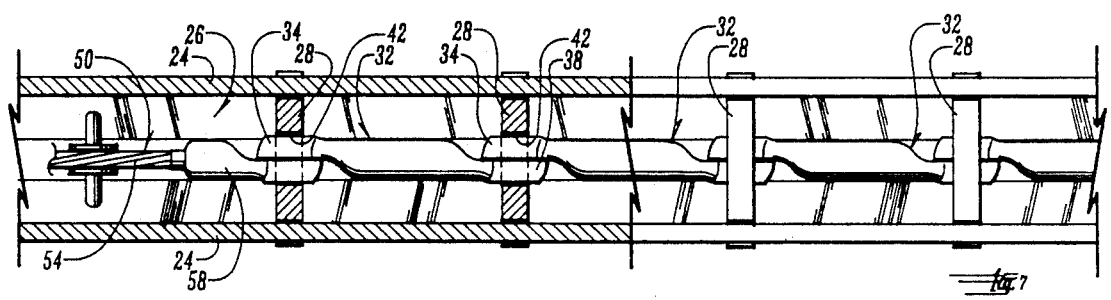

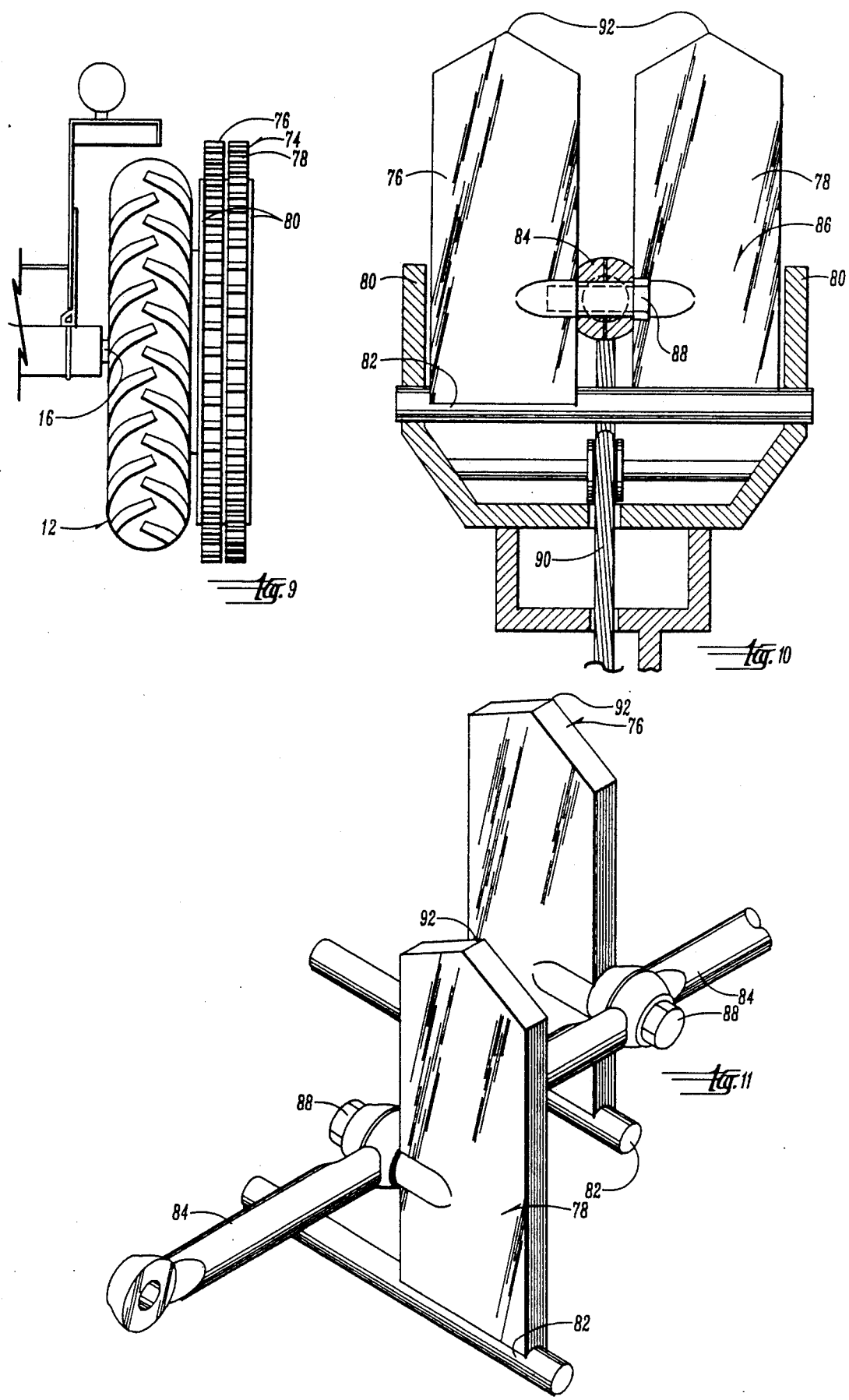

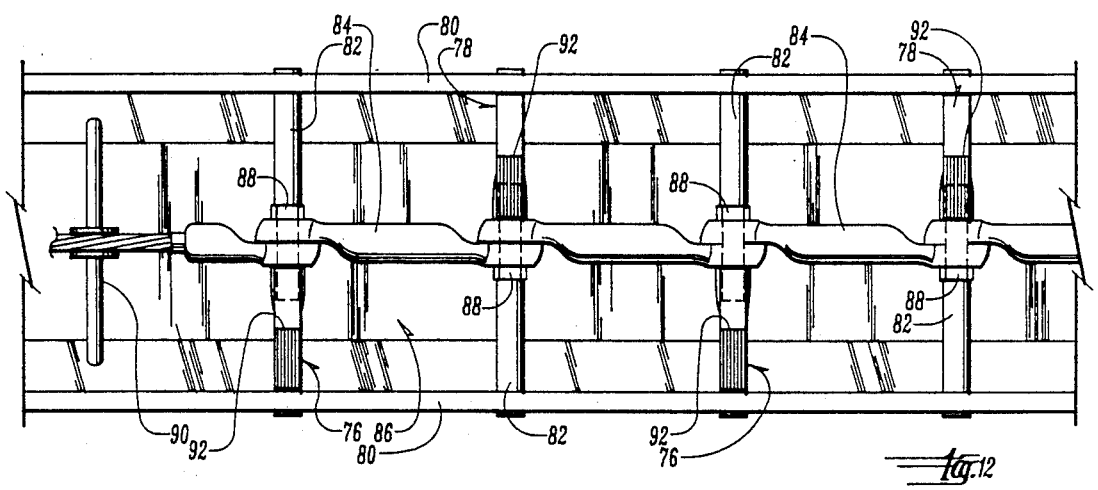

AUXILIARY TRACTOR WHEEL FOR INCREASED TRACTION

SUMMARY OF THE INVENTION

Farmers often are concerned with traction of their tractor in a wet or muddy field. A farm tractor often has large dual wheels with deep tread tires on each side of the rear end of the tractor. However, such dual wheels may not be sufficient to provide the necessary traction in some fields.

Therefore, a primary objective of the present invention is the provision of an auxiliary tractor wheel for increased traction.

Another objective of the present invention is the provision of an auxiliary traction wheel which replaces one of the dual wheels of a tractor.

A further objective of the present invention is the provision of an auxiliary tractor wheel having traction spikes or plates which can be selectively engaged and disengaged for improving traction in a field.

Still another objective of the present invention is the provision of a tractor traction wheel which is easy to install and durable in use.

These and other objectives will become apparent from the following description of the invention.

SUMMARY OF THE INVENTION

An auxiliary traction wheel is provided for use on an agricultural tractor, normally in combination with the rear tractor wheels. The traction wheel is mounted on the axle of the tractor adjacent the standard tractor wheel. The auxiliary traction wheel has a pair of spaced apart rims adjacent its perimeter edge which define an annular channel extending around the wheel. A plurality of traction plates or spikes are pivotally mounted between the rims on the wheel for movement between a retracted position wherein the plates or spikes reside between the rims, and an extended position wherein the plates or spikes extend radially outwardly beyond the perimeter edge of the wheel. The traction plates or spikes are interconnected to one another by connecting rods. Preferably, there are two sets of traction plates or spikes, each of which extend approximately half way around the traction wheel. A spring-tensioned actuation cable controls the position of each set of plates or spikes. The plates or spikes are normally urged to the extended position, and a lock is provided on the cables to hold the plates or spikes in the retracted position.

BRIEF DESCRIPTION OF THE DRAWINGS

FIG. 1 is a side elevation view of an agricultural tractor.

FIG. 2 is a partial rear elevation view of the tractor, showing a standard tractor wheel with the auxiliary traction wheel of the present invention connected thereto.

FIG. 3 is a side elevation view of the auxiliary traction wheel connected to the tractor wheel, with the traction plates in the extended position.

FIG. 4 is a view similar to FIG. 3 showing the retraction plates in the retracted position.

FIG. 5 is an enlarged partial side elevation view of the traction wheel.

FIG. 6 is a sectional view taken along lines 6—6 of FIG. 5.

FIG. 7 is a sectional view taken along lines 7—7 of FIG. 5.

FIG. 8 is a perspective view of a traction plate and connecting rods.

FIG. 9 is a view similar to FIG. 2 showing an alternative embodiment of the auxiliary traction wheel.

FIG. 10 is a view similar to FIG. 6 showing the alternative embodiment wherein the traction plate or spikes are offset with respect to one another.

FIG. 11 is a perspective view similar to FIG. 8 showing the alternative embodiment.

FIG. 12 is a sectional view similar to FIG. 7 showing the alternative embodiment.

DETAILED DESCRIPTION OF THE DRAWINGS

An agricultural tractor is shown in FIG. 1 and includes a pair of large rear wheels 10 with a tire 12. The tire 12 is a standard tractor tire having deep, offset treads 14, as best seen in FIG. 2. Often times, a dual wheel (not shown) is utilized in conjunction with wheel 10, with both wheels being rotatably mounted upon an axle 16.

The present invention is directed towards an auxiliary traction wheel 18 which is mounted upon axle 16, and which replaces the dual tractor wheel. Wheel 18 includes a central hub 20, a plurality of spokes 22, and a pair of spaced apart outer rims 24 at the perimeter edge of the wheel. Rims 24 define an annular channel 26, as best seen in FIG. 6.

A plurality of traction spikes or plates 28 are pivotally mounted on the perimeter edge of traction wheel 18. More particularly, each plate 28 is mounted a pin 30 which is pivotally supported between rims 24, as seen in FIGS. 6 and 7. Adjacent plates 28 are interconnected by a connecting rod 32. As seen in FIGS. 7 and 8, each connecting rod 32 has a first end 34 with a lateral face 36 and a second end 38 with a lateral face 40. Ends 34 and 38 are offset with respect to one another such that faces 36 and 40 are coplanar along the longitudinal axis of rod 32. Faces 36 and 40 oppose one another such that the face 40 on second end 38 of one rod 32 matingly engages with the face 36 on the first end 34 of an adjacent rod 32, as seen in FIG. 7.

Each traction spike or plate 28 includes a slot 42 for receiving the mating ends of adjacent connecting rods 32. Each end 34, 38 of the connecting rods 32 has a hole 44 extending therethrough for receiving a bushing 46 through which a mounting pin 48 extends. Pin 48 is press fit within a corresponding hole in traction plate 28 such that the ends of connecting rods 32 are pivotally mounted upon the pin 48.

It is understood that the exact shape of the traction plates and connecting rods, and the interconnections therebetween, may be modified without departing from the scope of the present invention.

Traction plates 28 are pivotal between a retracted position wherein the plates are drawn substantially into the channel 26 between rims 24, as seen in FIG. 4 and as shown in broken lines in FIG. 5, and an extended position wherein the plates extend radially outwardly beyond the rims 24, as seen in FIGS. 3 and 5. Actuation means 50 are provided for moving the plates between the retracted and extended positions. Preferably, plates 28 are arranged in two sets, one of each set extending approximately half way around the wheel 18. As seen in FIGS. 3 and 4, a separate actuation means 50 is provided for each set of traction plates.

Each actuation means 50 includes a first cable 52 having a first end 54 connected to the hub 20 of wheel 18 in any convenient manner, and a second end 56 connected to a modified connecting rod 58. Modified connecting rod 58 is essentially identical to half a connecting rod 32, with an end similar to second end 38 of connecting rod 32, as seen in FIG. 7. Actuation means 50 also includes a second cable 60 having a first end 62 connected to hub 20 by any convenient means and a second end 64 connected to another modified connecting rod 66 which is similar to the first end 34 of connecting rod 32.

Thus, the first cable 52, modified connecting rod 58, connecting rods 32, modified connecting rods 66, and second cable 60 define a continuous linkage for each set of traction plates. A tension spring 68 is provided between first end 62 and second end 64 of second cable 60 so that the plates are normally urged to the extended position. At least one cross bar 69 is mounted on rim 24 for each set of traction plates. Cross bar 69 acts to limit or stop the pivotal movement of the plates 28 towards the extended position, such that the plates do not pivot beyond a radially extending orientation. While the drawings show a single cross bar 69 for each set of traction plates, a cross bar can be mounted on the rims for each plate, if necessary for increased structural support. An over-center chain lock 70 is provided on cable 52 so as to pull the linkage, and thus the traction plates 28, to the retracted position, as seen in FIG. 4.

In operation, traction wheel 18 is mounted onto axle 16 with conventional lugnuts 72 adjacent tractor wheel 10. By releasing lock mechanism 70, as shown in FIG. 3, traction plates 28 will be urged counter-clockwise, as shown in the drawings, to the extended position by spring 68, as limited by cross bar 69, for use in a muddy field or other environment where extra traction is needed. Thus, as traction wheel 18 rotates, plates 28 will pull through the mud to help move the tractor through the field. For use in dry fields, or other environments wherein extra traction is not necessary, lock mechanism 70 is closed, as seen in FIG. 4, thereby pulling the modified connecting rod 58, the linked connecting rods 32, modified connecting rod 66, second cable 60 and spring 68 so as to retract traction plates 28 clockwise, as seen in FIGS. 4 and 5.

An alternate embodiment of an auxiliary traction wheel 74 is shown in FIGS. 9–12. Alternative wheel 74 is substantially identical to traction wheel 18, except that there are two rows of traction plates 76, 78 which are laterally offset with respect to one another.

A pair of rims 80 are spaced apart further than rims 24 so as to accommodate the offset traction plates 76, 78. Each plate is mounted upon a pin 82 which is pivotally mounted in rims 80. As best seen in FIG. 10, each plate 76, 78 is mounted on one side of the pin 82, beyond the middle of the pin. Connecting rods 84 extend substantially along the axis of channel 86 defined by rims 80 so as to interconnect successive traction plates 76, 78. Rods 84 are substantially identical to connecting rods 32, but are bolted to the inner side of each traction plate 76, 78, with a bolt 88, as best seen in FIG. 11.

Actuation means 90, similar to actuation means 50, is utilized to move plates 76, 78 between the extended and retracted positions, as described above with respect to traction wheel 18.

As best seen in FIG. 10, traction plates 76, 78 have a pointed outer end 92. It is understood that the shape and dimensions of the traction plates can vary without departing from the scope of the present invention.

From the foregoing, it can be seen that the present invention accomplishes at least all of the stated objectives.

What is claimed is:

1. In combination with a tractor wheel rotatably mounted on a rear axle of a tractor, an auxiliary tractor wheel comprising:

wheel means mounted on the axle adjacent the tractor wheel, and having a perimeter edge;

a plurality of traction plates pivotally mounted on the wheel means for movement between a retracted position wherein the traction plates are drawn within the perimeter edge of the wheel means and an extended position wherein the traction plates extend radially outwardly beyond the perimeter edge of the wheel means; and actuation means for moving the traction plates between the retracted and extended positions, the actuation means including tension means for urging the traction plates to the extended position, and the actuation means further including adjustment means for adjusting the tension in the tension means.

2. The traction wheel of claim 1 wherein the wheel means includes a pair of spaced apart rims adjacent the perimeter edge which define an annular channel for housing the traction plates in the retracted position.

3. The traction wheel of claim 2 wherein the traction plates are pivotally mounted between the rims.

4. The traction wheel of claim 3 further comprising a plurality of mounting pins pivotally extending between the rims, and each traction plate extending from one of the mounting pins.

5. The traction wheel of claim 1 further comprising a plurality of connecting rods, one of which extends between adjacent traction plates such that the traction plates are interconnected at least partially around the perimeter of the traction wheel.

6. The traction wheel of claim 1 wherein each traction plate is laterally offset with respect to the next adjacent traction plate.

7. The traction wheel of claim 1 wherein the traction plates extend beyond the tractor wheel when in the extended position.

8. The traction wheel of claim 1 wherein the tension means is a spring.

9. The traction wheel of claim 1 wherein the actuation means further includes lock means movable between a locked position when the traction plates are in the retracted position and an unlocked position when the traction plates are in the extended position.

10. The traction wheel of claim 9 wherein the lock means increases the tension in the tension means when in the locked position.

11. The traction wheel of claim 1 wherein the adjustment means comprises a turnbuckle.

12. The traction wheel of claim 1 further comprising stop means for limiting the pivotal movement of the traction plates beyond the extended position.

13. A traction wheel for use on a drive axle of a prime mover, comprising:

a wheel mounted on the axle and having a perimeter edge;

traction means pivotally mounted around the perimeter edge for movement between a retracted position within the perimeter edge and an extended position beyond the perimeter edge; and actuation means for moving the traction means between the retracted and extended position, the actuation means including a pair of linkages, each extending around substantially one half of the perimeter edge of the wheel in opposite directions to one another and interconnecting the traction means such that each cable controls the movement of one half of the traction means.

14. The traction wheel of claim 13 wherein the wheel includes a pair of spaced apart rims adjacent the perimeter edge and defining an annular channel for receiving the traction means in the retracted position.

15. The traction wheel of claim 13 wherein the actuation means includes tension means for urging the traction means to the extended position.

16. The traction wheel of claim 13 wherein the actuation means further includes lock means movable between a locked position wherein the traction means are in the retracted position and an unlocked position wherein the traction means are in the extended position.

17. In combination with a tractor wheel rotatably mounted on a rear axle of a tractor, an auxiliary tractor wheel comprising:

wheel means mounted on the axle adjacent the tractor wheel, and having a perimeter edge;

a plurality of traction plates pivotally mounted on the wheel means for movement between a retracted position wherein the traction plates are drawn within the perimeter edge of the wheel means and an extended position wherein the traction plates extend radially outwardly beyond the perimeter edge of the wheel means; and actuation means for moving the traction plates between the retracted and extended positions, the actuation means including a pair of linkages, each extending around substantially one half of the perimeter edge of the wheel means in opposite directions to one another and interconnecting the traction plates, such that each linkage controls the movement of one half of the traction plates.

* * * * *